Feb. 7, 1956 J. F. BRYER ET AL 2,733,494
MOLD AND METHOD FOR MANUFACTURE THEREOF
Filed June 22, 1954 2 Sheets-Sheet 1

INVENTORS
JOHN F. BREYER,
RICHARD E. STEELE AND
ANDREW R. BLACKBURN
BY *Burns, Doane, Benedict & Krone*
ATTORNEYS Feb. 7, 1956  J. F. BRYER ET AL  2,733,494
MOLD AND METHOD FOR MANUFACTURE THEREOF
Filed June 22, 1954  2 Sheets-Sheet 2
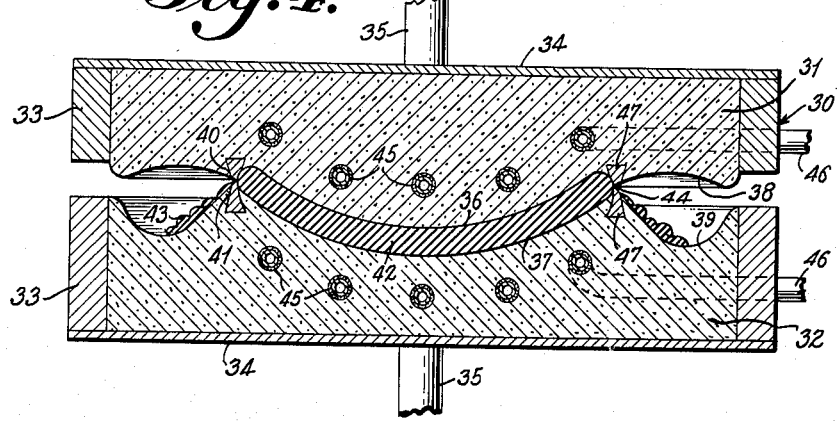
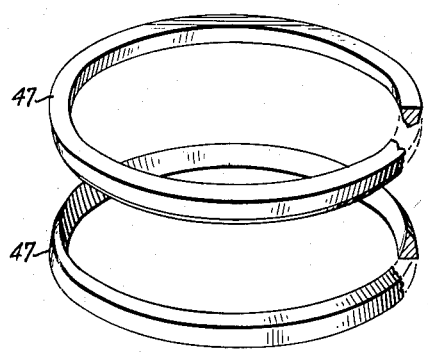
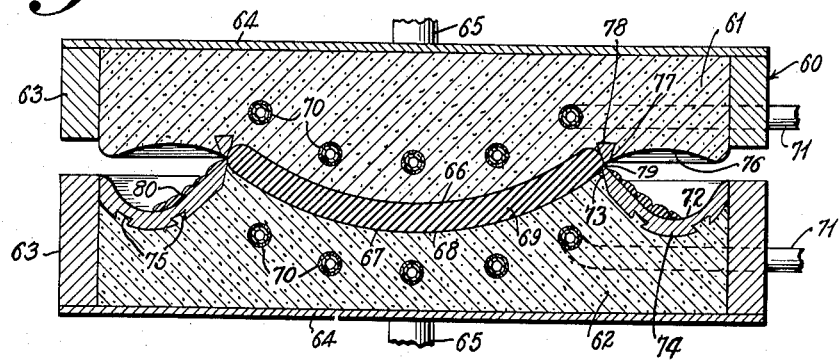
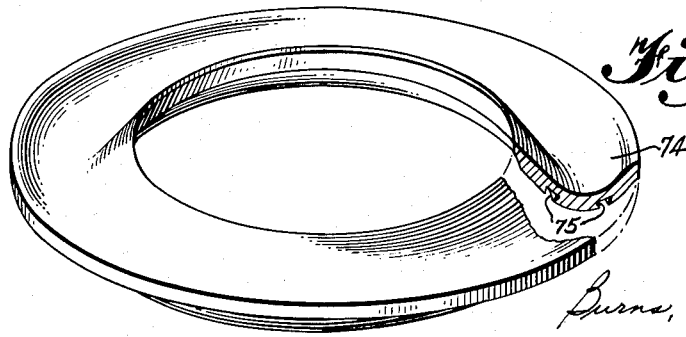
INVENTORS
JOHN F. BRYER,
RICHARD E. STEELE AND
ANDREW R. BLACKBURN
Burns, Doane, Benedict & Lyons
ATTORNEYS United States Patent Office 2,733,494
Patented Feb. 7, 1956

2,733,494

MOLD AND METHOD FOR MANUFACTURE THEREOF

John F. Bryer, Wellsville, Richard E. Steele, Worthington, and Andrew R. Blackburn, Westerville, Ohio, assignors to Ram Incorporated, Columbus, Ohio, a corporation of Michigan Application June 22, 1954, Serial No. 438,373

7 Claims. (Cl. 25—129)

This invention relates to improved molds formed essentially of permeable material, such as plaster, which are useful in the production of shaped ware from plastic material, including plastic clay. More particularly, the invention embraces molds for forming ceramic ware by plastic pressing which enjoy a substantially longer life than similar molds previously known to the art and wherein separation of the ware from the flash after molding is facilitated.

The cooperable, permeable die members employed in molds used for the plastic pressing of ceramic ware and the like are provided with ware-forming surfaces separated by suitable opposed projections from surrounding scrap receiving areas. When such molds are closed, the ware-forming surfaces of the die members define a ware-shaping cavity separated by the opposed projections from a gutter formed by the scrap receiving areas of the die members. It is necessary that the projections of the die members be of such length and contour as to form a restricted passage between the ware-forming cavity and the surrounding gutter when the mold is closed. The projections which separate the ware-forming surfaces from the scrap receiving areas of the die members tend to wear and dissolve away more rapidly than the other portions of the surface of the die members. Hence, in many instances, the life of the die members is determined by the fact that such projections lose contour and decrease in size and height to an extent such that the die members and the mold in which the die members are employed, become inoperable.

In prior Blackburn and Steele Patent 2,584,109 there is described and claimed an improvement, known to the art as the "fluid release process," whereby the conventional plastic pressing method for forming ceramic ware may be practiced on a mass production basis. Fluid permeable conduits are positioned within the plaster die members used in the "fluid release process" for applying fluid under pressure through the contoured ware-forming surfaces of the die members. Pursuant to the fluid release process the die members are first moved to an open position, a batt or mass of moist plastic material, such as moist clay, is placed on one die member, and the die members are closed to shape the ware and thereby force moisture from the plastic material into the die members. Thereafter, a fluid under pressure, such as compressed air, is passed into the permeable conduit of the first of the die members and then outwardly through the contoured ware-forming surface of the first die member to release the ware therefrom.

After pressurization, as above described, the first die member is separated from the shaped ware which is left supported by the remaining die members. The remaining die members are then pressurized in the same manner as the first die member to effect release of the ware therefrom in an easily deformable condition.

The release fluid, in moving from the conduits to the forming faces of the die members, in the "fluid release" process inherently forces water, absorbed by the die members in the ware-shaping step, toward the surfaces thereof. The release fluid moves in all directions from the conduit in the die members and hence causes water to move through the die members not only in the zone of the ware-shaping surfaces but also throughout the scrap receiving areas and the projections separating the ware-shaping surfaces from the scrap receiving areas.

The problem of die life is accordingly of particular significance with respect to dies or molds used in conjunction with the above described fluid release process to the end that the advantages thereof may be fully realized. Significantly, even though calcium sulphate is but slightly water soluble, the frequently repeated, alternating passage of moisture through the plaster die members in the fluid release process is effective to dissolve a sufficient portion of the plaster of the die members to unduly hasten the loss of contour of the projections separating the ware forming surfaces from the scrap receiving areas thereof. Additionally, since the die members are continuously and repeatedly used on a mass production basis in the fluid release process, the die members, including the critical projections thereof, wear rapidly, especially as compared with die members employed in the conventional plastic pressing process for the production of ceramic ware.

The art has recognized the desirability of prolonging the life of the plaster die members employed, especially in the "fluid release" process, provided the performance of the die members in repeatedly shaping and releasing ware be not adversely affected. This invention embraces one solution to that problem.

It is a primary object of this invention to provide a novel mold useful in the production of plastic ware by pressing, wherein separation of the ware from the flash is facilitated and which is characterized by a substantially longer useful life than similar molds previously available to the art.

It is a further object of the invention to provide a die member useful in the formation of plastic material into shaped ware by pressing, having means separating the ware-forming area from the scrap receiving area thereof which retains contour for a substantially longer period of time than similar separating means of the die members previously available.

It is an important object of the invention to provide die members for use in the formation of ceramic ware by the "fluid release" process, which enjoy a longer useful life than similar die members of the prior art.

It is yet another object of the invention to provide a die member, useful for shaping plastic material by plastic pressing, having a contoured ware-forming surface separated from a surrounding scrap receiving area by a projection having a substantially water-insoluble, wear-resistant crown.

It is an additional object of the invention to provide a die member, useful for shaping ceramic ware, having a ware-forming surface separated from a scrap receiving area by a projection carrying a wear-resistant and water-insoluble member exposed at the peak thereof.

It is a specific object of the invention to provide a die member useful for shaping ceramic material including a fluid permeable die body having a contoured ware-shaping surface surrounded by a flash receiving gutter and separated therefrom by a projection having a metal peak whereby separation of the ware from the flash is facilitated and the useful life of the die member is substantially prolonged.

It is a further object of the invention to provide a permeable plaster die member having a solid, substantially water-insoluble member covering and conforming in contour to at least a portion of the scrap receiving area of the die member and extending to and forming at least a portion of the crown of the projection separating the scrap receiving area from the ware-shaping surface of the die member.

The invention will be best understood by reference to the drawings, in which—

Figure 4 is a vertical sectional view of the mold embodying a different form of the present invention;

Figure 5 is a perspective view, partly in section, of the wear-resistant elements employed in the mold shown in Figure 4;

Figure 6 is a vertical sectional view of a mold embodying still another form of the present invention;

Figure 7 is a perspective view, partly in section, of a wear-resistant, gutter-covering member carried by the lower female die member of the mold shown in Figure 6.

In a broad sense, the present invention embraces a die member for shaping plastic material, and particularly plastic clay, comprising a fluid permeable, die body, preferably of plaster, having a contoured, ware-shaping surface, a scrap receiving area surrounding said surface, a projection separating said surface from said scrap receiving area, and a water-insoluble wear-resistant member forming at least a portion of the the top of said projection for prolonging the useful life of the die member.

Figure 1:
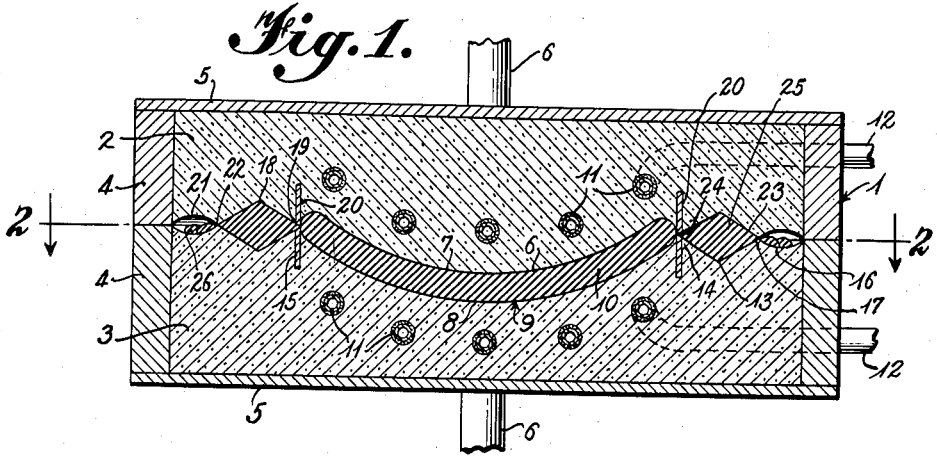
Figure 1 is a vertical section of a mold embodying one form of the present invention.

The embodiment of the invention shown in Figure 1 embraces a mold 1 including cooperable die members 2 and 3, each enclosed by a metal mold ring 4 and a metal base plate 5 secured to shafts 6 for opening and closing the mold. Each of the mold members 2 and 3 is formed of a fluid permeable material, preferably plaster, which may desirably be treated in accordance with the method of Bryer and Steele Patent No. 2,632,209, entitled "Treatment of Plaster Molds." The mold members 2 and 3 are respectively provided with cooperable, wareshaping surfaces 7 and 8 which define a ware-shaping cavity 9 for the ware 10 when the mold is closed, as shown in the figure.

Fluid permeable conduits 11, which may take the form of woven Fiberglas tubes, are positioned in the die members 2 and 3 for applying fluid pressure through the ware-shaping surfaces thereof. The conduits 11 terminate in lines 12 which may be connected in conventional manner to a source of fluid pressure, such as compressed air (not shown).

Figure 2:
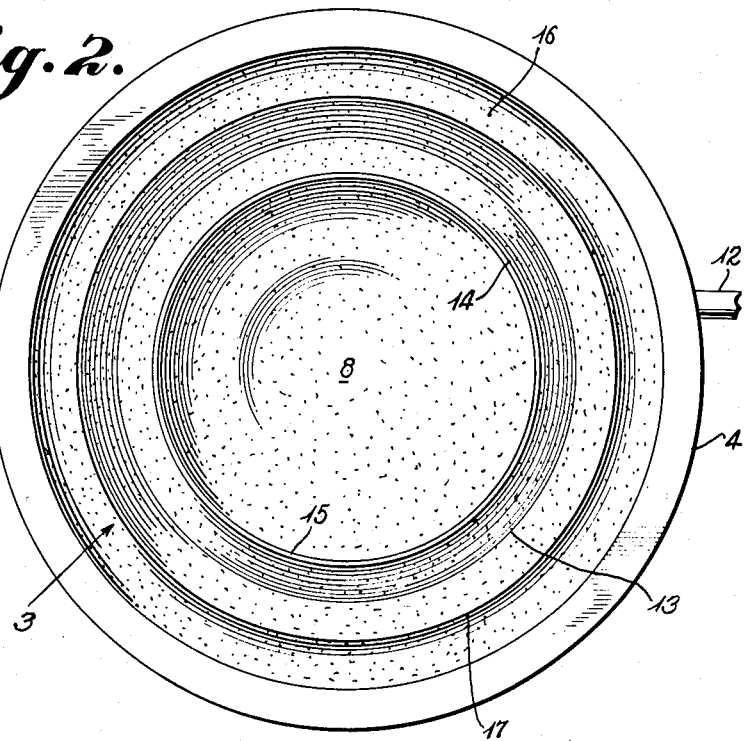
Figure 2 is a top view of the lower, female die member of the mold shown in Figure 1.
Figure 3:
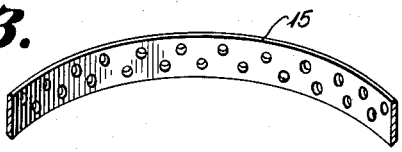
Figure 3 is a sectional view of a wear-resistant member of the type employed in the mold shown in Figure 1.

Surrounding the ware-shaping surface 8 of the die member 3 is a scrap receiving area 13 separated from the ware-forming surface 8 by the projection 14. The projection 14 carries the water-insoluble wear-resistant member 15 which, in the embodiment shown in the drawing, takes the form of a metal strip having one edge exposed at the peak of the projection 14. The metal strip extends along the projection 14 completely around the ware-forming surface, as shown best in Figure 2. The metal strip is preferably perforated, see Figure 3, to provide means for anchoring the strip to the plaster.

In the embodiment of the invention shown in Figure 1, the scrap receiving area 13 is spaced from the outer edge of the die member 3 by a smaller scrap receiving area 16 from which it is separated by the projection 17. It is within the purview of this invention to provide additional wear-resistant members in projections such as projection 17 which separate the scrap receiving areas of the die members. It will be appreciated that the scrap receiving zone of the die members of this invention may take any suitable configuration, so long as the projection separating the ware-shaped surface of the die member from the scrap receiving area is provided with a water-insoluble wear-resistant crown. Reference is made to Steele et al. Patent No. 2,627,641 which discloses a "Multiple Gutter Die" having a scrap receiving zone separated by suitable projections into a plurality of gutters. Each such projection can appropriately be provided with a metal or similar crown in the manner contemplated by this invention.

The die member 3 is suitably fabricated by pouring wet plaster into the chamber defined by the mold ring 4, and a master impression suitable for forming the necessary contouring surface 8, the scrap receiving areas 13 and 16, and the separating projections 14 and 17 in the wet plaster. The strip 15, preshaped to the desired configuration, is appropriately positioned on the master impression before the plaster is cast thereupon. The base plate 5 is attached in conventional manner.

The strip 15 may be copper-coated stainless steel to promote adherence thereof to the plaster. When corrosion is a problem, the strip may be formed of brass, stainless steel, or other non-corrosive alloy. Alternatively, the strip may be fabricated of plastic or synthetic resinous material, such as urea formaldehyde resins, polystyrene, and the like. The strip 15 must meet the prerequisite of being water-insoluble and wear-resistant, but otherwise, the composition thereof is not critical.

Similarly, the upper male die member 2 is provided with a scrap receiving area 18 separated from the ware-forming surface 7 by a projection 19 which carries a metal strip 20, similar to the strip 15 carried by the lower female die member. A smaller scrap receiving area 21 separated by projection 22, which may also carry a metal strip, is formed adjacent the scrap receiving area 18. The die member 2 may be produced in the same manner as the die member 3.

In use, the mold shown in Figure 1 is first opened as by means of shafts 6, a batt of plastic ceramic material, such as clay, is positioned on the lower female die member 3, the mold is closed to the position shown in the drawing to shape the ware 10, fluid pressure is applied through the conduit 11 of the lower die member 3 to release the ware therefrom, the die members are opened, and thereafter fluid pressure is applied through the conduit 11 of the upper die member 2 to complete the release of the ware from the mold. As the ware is shaped by the closing of the die members, excess plastic material 23 is forced through the restricted opening 24 between the projections 14 and 19 and into the large gutter 25 formed by the scrap receiving areas 13 and 18 of the die members, and the adjacent small gutter 26 formed by the scrap receiving areas 16 and 21. Due to the presence of the wear-resistant members 15 and 20, the life of the die members 2 and 3 is substantially lengthened since the projections 14 and 19, which separate the ware-forming surfaces from the adjacent scrap receiving areas of the die members, do not wear and dissolve away, and thereby render the mold inoperable.

A further embodiment of the invention is shown in Figures 4 and 5. Figure 4 represents a mold 30, including two cooperable die members 31 and 32, each enclosed by a mold ring 33 and a base plate 34 secured to shafts 35 for opening and closing of the mold. Each of the mold members 31 and 32 is formed of a fluid permeable material, such as plaster of Paris. The mold members 31 and 32, respectively, are provided with cooperable, opposed, ware-shaping surfaces 36 and 37 and scrap receiving areas 38 and 39 separated by projections 40 and 41. When the mold is closed, as shown in the drawing, the ware-shaping surfaces 36 and 37 define a ware-shaping cavity 42 separated from the gutter 43 by projections 40 and 41 which are of such contour and height as to define a restricted passage 44 therebetween. Fluid permeable conduit means 45, which may take the form of woven Fiberglas tubes, terminating in lines 46 for connection to a source of fluid pressure (not shown), are positioned in each of the die members 31 and 32 for the application of fluid pressure through the ware-forming surfaces of each of the die members.

The mold shown in Figures 4 and 5 is of the so-called self-scrapping type more specifically disclosed and claimed in copending application Serial No. 298,698, the specification and drawings of which are incorporated herein by reference. Briefly stated, molds of the type shown in Figures 4 and 5 and in copending application Serial No. 298,698 embrace die members having the opposed scrap receiving areas so formed as to provide sufficient differential adherence that the scrap will separate from and remain adherent to one of the die members when the mold is opened.

It will be observed by reference to Figure 4, that the scrap receiving area 39 of the lower, female die member 32 is substantially large in volume and presents a substantial greater surface area for contact with the scrap than does the opposed scrap receiving area 38 of the upper, male die member 31.

The projections 40 and 41 are each provided with a wear-resistant, water-insoluble, metal wedge-shaped ring 47. The wedge-shaped rings employed in the mold shown in Figure 4 are more massive than the metal strips 15 and 20 employed in the mold shown in Figure 1, and are more desirable in some cases.

The die members 31 and 32, shown in Figure 4, may be manufactured in a manner similar to that described with respect to the die members 2 and 3 shown in Figure 1. The die members may be formed in conventional manner from wet plaster, the projections 40 and 41 being provided with cavities or channels for receiving normally solid material in the liquid state, such as a molten, low-melting alloy, after the plaster of the die has set. Suitable molten material, such as a synthetic resin, or low-melting alloy, can be cast in such cavities or channels without damage to the die, and in some cases before the die is removed from the master impression. Also, low-melting alloys or like solid materials can be cast against the master impression in suitable position and shape before the plaster used to form the die member is poured and formed on the impression.

The mold as shown in Figure 4 is used in generally the same manner as the mold shown in Figure 1. When the die members 31 and 32 are opened, the scrap remains adherent to the die member 32.

The massive, wear-resistant, water-insoluble members which characterize the mold of Figure 4, impart several advantageous features to the performance of the die members. As a matter of primary significance, such massive edges of the separating projections prevent or minimize dewatering of the scrap adjacent the shaped piece of ware, thereby allowing greater ease in removing the scrap, facilitating finishing, and minimizing the damage to the pressed piece in the process of separating the scrap therefrom.

The mold as shown in Figure 6 embraces still another embodiment of the invention, particularly as applied to "self-scrapping dies," in which the wear-resistant, water-insoluble member for prolonging the useful life of the die, extends across and conforms in contour to the scrap receiving area of one of the die members which constitute the mold. Figure 6 shows a mold 60 including cooperable die members 61 and 62, each enclosed by a mold ring 63 and a base plate 64 secured to a shaft 65. Each of the mold members 61 and 62 is formed of fluid permeable material, such as permeable plaster of Paris. The mold members 61 and 62 are respectively provided with cooperable ware-shaping surfaces 66 and 67 which define a ware-shaping cavity 68 for forming the ware 69 when the mold is closed, as shown in the drawing. Fluid permeable conduit means 70, which may take the form of woven Fiberglas tubes, are positioned in each of the mold members 61 and 62 for the application of fluid pressure through the ware-shaping surfaces of the die members 61 and 62. The conduit means 70 terminate in lines 71, which may be connected in conventional manner to a source of fluid pressure, such as compressed air (not shown).

Surrounding the ware-shaping surface 67 of the female die member 62 is a scrap receiving area 72 separated from the ware-shaping surface 67 by a projection 73. The scrap receiving area 72 carries a water-insoluble wear-resistant member 74 extending completely thereacross, terminating at the peak of the projection 73. In the embodiment shown in the drawing, this wear-resistant member is made of metal and is provided with suitable keyways 75 for locking or securing the member 74 to the plaster body of the mold member 62.

The upper male die member 61 is provided with a scrap receiving area 76 separated from the ware-shaping surface 66 by the projection 77 which carries a wedge-shaped metallic member 78, generally similar to the rings 46 shown in Figures 4 and 5, terminating at and forming the peak of the projection 77. The projections 73 and 77 are opposed and are of such height and contour as to define a restricted passage 79 therebetween.

The mold as shown in Figure 6 is used in generally the same manner as the molds shown in Figure 4. However, the massive metal member 74, which is carried by the lower female die member 72, is advantageous in improving the operation of the self-scrapping feature and in facilitating removal of the scrap from the shaped ware without damage thereto. If the metal carried by the projection 73, which separates the ware-shaping surface 67 from the scrap receiving area 72 were absent or small (as in Figures 1 and 4) in relation to the scrap area, the release fluid from permeable conduit 70, which moves in all directions through the die member may sometimes be effective to release, or partially release, the scrap 80 from the scrap receiving area 72, as well as the ware 69 from the ware-shaping surface 67. However, when the scrap area is wholly or partially covered, as by the metal member 74 in Figure 6, the scrap, which is adherent to the member 74, is protected from the action of the release fluid. Accordingly, the scrap is more readily separated from the shaped piece when the die members are opened and remains adhered to the lower die member 62. More particularly, the scrap receiving areas of the self-scrapping dies, as disclosed in copending application Serial No. 298,698, can be covered with a solid, preferably metal, member such as the member 74 of Figure 6 of the present application.

It will be appreciated from the foregoing that molds of the type here described find utility in the shaping of plastic materials of all types, including synthetic resinous materials, plastic masses, such as plastic clay and like ceramic material, moldable natural material, such as rubber, and similar compositions.

This application is a continuation-in-part of copending application Serial No. 298,698.

We claim:

1. A die member for shaping plastic material by pressing comprising a fluid permeable die body having an exposed contoured ware-shaping surface, a fluid permeable conduit in said die member for discharge of fluid under pressure through said ware-shaping surface, a scrap receiving area surrounding said surface, a projection separating said surface from said scrap receiving area and a substantially impermeable, water-insoluble and wear-resistant insert forming at least a portion of the top of said projection for prolonging the useful life of the die member and preventing discharge of fluid through said wear-resistant member.

2. A mold for pressing plastic material, including moisture-containing ceramic material, to form shaped ware, comprising cooperable, permeable die members movable from an open position to a closed, ware-shaping position, said die members having opposed ware-forming contoured surfaces, defining a ware-forming cavity when the mold is closed; opposed scrap receiving areas surrounding the ware-forming surfaces of each of said die members, opposed projections separating the scrap receiving areas from the ware-forming surfaces of each of said die members, said projections being of a height such that a restricted passage is formed therebetween when the mold is closed; a substantially impermeable, water-insoluble and wear-resistant insert carried by at least one of said die members and forming the peak of the projection thereof, and a fluid permeable conduit positioned in at least one of said die members for discharge of fluid under pressure through the ware-forming surface thereof.

3. A mold for shaping plastic material by pressing comprising a pair of opposed cooperable, permeable die members movable from an open to a closed position, each of said die members having a ware-forming surface separated by a projection from a scrap receiving area and being provided with conduit means for applying a fluid under pressure through the ware-forming surface thereof, the projection of one of said die members being provided with a substantially impermeable wear-resistant, water-insoluble crown, the other of the die members having a wear-resistant, water-insoluble insert covering and conforming to the contour of at least a portion of the scrap receiving area thereof and extending to and forming the crown of the projection thereof.

4. A die member for shaping plastic material by pressing, comprising a fluid permeable plaster die body having an exposed contoured, ware-shaping surface, a fluid permeable conduit in said die member for discharge of fluid under pressure through said ware-shaping surface, a scrap receiving area formed in said die member and surrounding said surface, a projection separating said scrap receiving area from said surface, a wedge-shaped metal member forming at least a portion of the top of said projection, extending lengthwise thereof and having one edge exposed along the top of said projection, for prolonging the useful life of the die and preventing discharge of fluid through said metal member.

5. A die member for shaping plastic material by pressing, comprising a fluid permeable plaster die body having an exposed contoured, ware-shaping surface, a fluid permeable conduit in said die member for discharge of fluid under pressure through said ware-shaping surface, a scrap receiving area formed in said die member and surrounding said surface, a projection separating said scrap receiving area from said surface, a metal member forming the peak of said projection, covering at least a portion of said scrap receiving area, and conforming to the contour thereof for prolonging the useful life of the die and preventing discharge of fluid through said metal member.

6. A mold for pressing plastic material, including moisture-containing ceramic material, to form shaped ware, comprising cooperable, permeable die members movable from an open position to a closed, ware-shaping position, said die members having opposed ware-forming contoured surfaces defining a ware-forming cavity when the mold is closed; opposed scrap receiving areas surrounding the ware-forming surfaces of each of said die members, opposed projections separating the scrap receiving areas from the ware-forming surfaces of each of said die members, said projections being of a height such that a restricted passage is formed therebetween when the mold is closed; a substantially impermeable, water-insoluble and wear-resistant insert carried by each of said die members and forming the peak of the projection separating the ware-forming surface from the scrap receiving area.

7. A mold as recited in claim 6 wherein the wear-resistant insert of one of the die members covers at least a portion of the scrap receiving area thereof and conforms to the contour of said area.

References Cited in the file of this patent

UNITED STATES PATENTS

| | | |
|---|---|---|
| 2,191,857 | Miller | Feb. 27, 1940 |
| 2,204,263 | Thoresen | June 11, 1940 |
| 2,480,426 | Skoning | Aug. 30, 1949 |
| 2,495,064 | Horvath | Jan. 17, 1950 |
| 2,584,110 | Blackburn et al. | Feb. 5, 1952 |
| 2,627,641 | Steele | Feb. 10, 1953 |
| 2,661,498 | Blaurock | Dec. 8, 1953 |